(12) United States Patent
Yajima et al.

(10) Patent No.: US 12,343,804 B2
(45) Date of Patent: Jul. 1, 2025

(54) DRIVE SYSTEM FOR CHUCK DEVICE

(71) Applicant: SMC CORPORATION, Tokyo (JP)

(72) Inventors: Hisashi Yajima, Tsukuba (JP); Gen Tsuchiya, Tsukubamirai (JP); Masayuki Ishikawa, Toride (JP); Takehiko Kanazawa, Kashiwa (JP)

(73) Assignee: SMC CORPORATION, Tokyo (JP)

( * ) Notice: Subject to any disclaimer, the term of this patent is extended or adjusted under 35 U.S.C. 154(b) by 466 days.

(21) Appl. No.: 17/683,819

(22) Filed: Mar. 1, 2022

(65) Prior Publication Data

US 2022/0219247 A1 Jul. 14, 2022

Related U.S. Application Data

(62) Division of application No. 16/881,055, filed on May 22, 2020, now Pat. No. 11,370,035.

(30) Foreign Application Priority Data

May 27, 2019 (JP) .................................. 2019-098747

(51) Int. Cl.
*B23B 31/30* (2006.01)
*B23B 31/175* (2006.01)
*B23Q 17/00* (2006.01)

(52) U.S. Cl.
CPC ...... *B23B 31/302* (2013.01); *B23B 31/16216* (2013.01); *B23Q 17/003* (2013.01);
(Continued)

(58) Field of Classification Search
CPC ............ B23B 31/302; B23B 31/16216; B23B 2260/128; B23B 2260/142; B23Q 17/003; Y10T 279/1208; Y10T 279/1298
See application file for complete search history.

(56) References Cited

U.S. PATENT DOCUMENTS

| 4,443,021 A | 4/1984 | Buchholz |
| 5,079,833 A | 1/1992 | Ebihara |
| (Continued) | | |

FOREIGN PATENT DOCUMENTS

| JP | 5-305593 A | 11/1993 |
| JP | 2002-524696 A | 8/2002 |
| (Continued) | | |

OTHER PUBLICATIONS

Office Action issued Feb. 7, 2023, in corresponding Japanese Patent Application No. 2019-098747 (with English Translation), 10 pages.
(Continued)

*Primary Examiner* — Eric A. Gates
*Assistant Examiner* — Eric Daniel Whitmire
(74) *Attorney, Agent, or Firm* — Oblon, McClelland, Maier & Neustadt, L.L.P.

(57) ABSTRACT

A drive system for driving a chuck device including a piston and a pair of fingers to be opened and closed according to the displacement of the piston, includes a controller, a detection sensor to detect an axial position of the piston, and three-port servo valves to switch a state of supply of the fluid to the chuck device. A degree of valve opening is controllable based on a control signal input from the controller, and an amount of displacement of the piston and an amount of opening and closing of the fingers are controlled by changing the degree of valve opening. One of the 3-port servo valves is connected to a first cylinder chamber of the chuck device, and another of the 3-port servo valves is connected to a second cylinder chamber of the chuck device.

2 Claims, 9 Drawing Sheets

(52) U.S. Cl.
CPC ... *B23B 2260/128* (2013.01); *B23B 2260/142* (2013.01); *Y10T 279/1208* (2015.01); *Y10T 279/1291* (2015.01)

(56) References Cited

U.S. PATENT DOCUMENTS

| | | | |
|---|---|---|---|
| 6,405,632 | B1 | 6/2002 | Liao et al. |
| 6,478,310 | B1 * | 11/2002 | Azami ............... B23B 31/1622 |
| | | | 279/4.12 |
| 7,210,394 | B2 | 5/2007 | Yajima |
| 7,610,754 | B2 | 11/2009 | Ochi |
| 11,117,237 | B2 | 9/2021 | Sawada |
| 2005/0217475 | A1 * | 10/2005 | Matsumoto ............... F15B 9/09 |
| | | | 91/465 |
| 2008/0169619 | A1 * | 7/2008 | Minbuta ............. B25J 15/0266 |
| | | | 269/34 |
| 2017/0209939 | A1 | 7/2017 | Miyamoto |
| 2017/0291226 | A1 | 10/2017 | Yamane |
| 2019/0030714 | A1 | 1/2019 | Knopf et al. |

FOREIGN PATENT DOCUMENTS

| | | | |
|---|---|---|---|
| JP | 3932392 | B2 | 6/2007 |
| JP | 2019-500223 | A | 1/2019 |

OTHER PUBLICATIONS

Office Action mailed Sep. 27, 2024, in co-pending U.S. Appl. No. 17/683,658.

* cited by examiner

DRIVE SYSTEM FOR CHUCK DEVICE

CROSS-REFERENCE TO RELATED APPLICATION

This application is based upon and claims the benefit of priority from Japanese Patent Application No. 2019-098747 filed on May 27, 2019, and is a Divisional application of U.S. patent application Ser. No. 16/881,055, filed on May 22, 2020, the contents of both of which are incorporated herein by reference.

BACKGROUND OF THE INVENTION

Field of the Invention

The present invention relates to drive systems for chuck devices capable of gripping workpieces via fingers that can be opened and closed.

Description of the Related Art

Chuck devices gripping and releasing workpieces under the effect of supply of air have been used for, for example, carrying the workpieces. As disclosed in Japanese Patent No. 3932392, the inventors have proposed a chuck device capable of gripping and releasing workpieces by opening and closing gripping members as a piston disposed inside a chuck body is displaced under the effect of supply of compressed air.

In the chuck device, when compressed air is supplied to the inside of the chuck body to move the piston toward an end member, levers engaged with the leading end of the piston rotate, and the gripping members engaged with the leading ends of the respective levers approach each other. As a result, the chuck device enters a gripping state where the chuck device can grip a workpiece. At this moment, the displacement of the piston is restricted by the piston brought into contact with the end member, and the gripping members are kept at a predetermined gripping position.

On the other hand, when compressed air is supplied to a space on a side opposite to the above in the chuck body, the piston moves in a direction away from the end member, and thereby the levers rotate in directions opposite to the above. As a result, the gripping members are separated from each other and enters a release state.

Moreover, in the chuck device, the end member is screwed into the upper end of the chuck body, and the position of the end member along the axial direction can be adjusted. To adjust the gripping position of the gripping members, the axial position of the end member is adjusted by rotating the end member. This limits the amount of stroke of the piston along the axial direction and thereby adjusts the amount of movement of the gripping members in directions along which the gripping members approach each other. In this manner, the gripping position is adjusted from a predetermined position.

SUMMARY OF THE INVENTION

However, in the above-described chuck device, the adjustable amount of movement of the gripping members (the adjustable amount of stroke of the piston) to adjust the gripping position is limited to the movable distance of the end member along the axial direction. In addition, since an operator performs the adjustment by rotating the end member, the adjustment work is complicated, and the positioning with high precision is difficult to achieve. Moreover, there is a demand to make adjustments to the amount of movement of the gripping members and to select the open or closed state of the gripping members using an electrical signal from a higher level controller.

A general object of the present invention is to provide a drive system and a control method for a chuck device capable of stopping fingers serving as gripping members at any position easily and with high precision.

According to an aspect of the present invention, provided is a drive system for driving a chuck device including a piston displaceable in an axial direction under an effect of supply of fluid and a pair of fingers configured to be opened and closed according to the displacement of the piston, the drive system comprising:

a controller;
a detection sensor configured to detect an axial position of the piston; and
a switching valve configured to switch a state of supply of the fluid to the chuck device,
wherein the switching valve is a servo valve, of which degree of valve opening is controllable based on a control signal input from the controller, and an amount of displacement of the piston and an amount of opening and closing of the fingers are controlled by changing the degree of valve opening.

According to the present invention, the chuck device includes the piston displaced in the axial direction by the fluid supplied to the chuck device and the pair of fingers opened and closed according to the displacement of the piston. The drive system including the chuck device includes the detection sensor configured to detect the axial position of the piston and the switching valve configured to switch the state of supply of the fluid to the chuck device. The switching valve is a servo valve of which degree of valve opening can be controlled based on the control signal input from the controller, and the amount of displacement of the piston and the amount of opening and closing of the fingers can be controlled by changing the degree of valve opening.

Thus, the degree of valve opening can be controlled by inputting the control signal to the switching valve made of the servo valve, and the direction and amount of displacement of the piston can be controlled by switching the state of supply of the fluid to the chuck device. Consequently, the amount of opening and closing of the pair of fingers can be easily controlled.

As a result, the fingers can be stopped at any position easily and with high precision by freely switching the switching valve using the control signal from the controller compared with the known chuck device that requires the operator to move the end member provided for the chuck body in the axial direction by rotating and thereby to adjust the amount of stroke of the piston so that the gripping members are stopped at a freely selected position.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
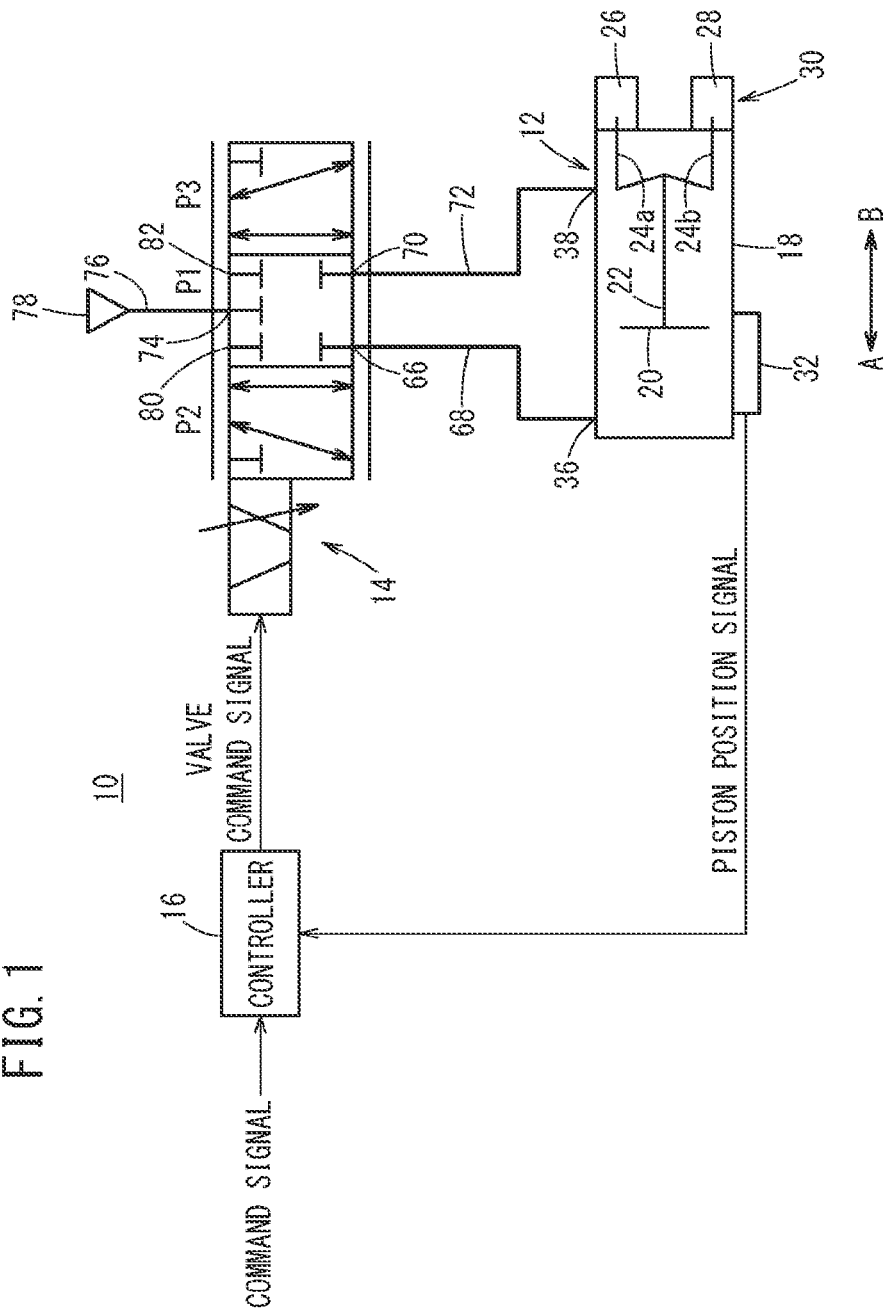
FIG. 1 is a schematic circuit diagram illustrating a drive system for a chuck device according to an embodiment of the present invention.

As illustrated in FIG. 1, a drive system 10 for driving a chuck device 12 according to an embodiment of the present invention is applied to the chuck device 12 opening and closing under the effect of supply of compressed air and includes a switching valve 14 switching a state of supply of compressed air (fluid) to the chuck device 12 and a controller 16 outputting a valve command signal (control signal) to the switching valve 14 based on an input command signal. Moreover, the drive system 10 selectively connects first and second ports 66 and 70 (described below) to first and second body ports 36 and 38 (described below), respectively, of the chuck device 12 through the switching action of the switching valve 14. In addition, the controller 16 stores a control map for driving the chuck device 12 in advance.

Figure 2:
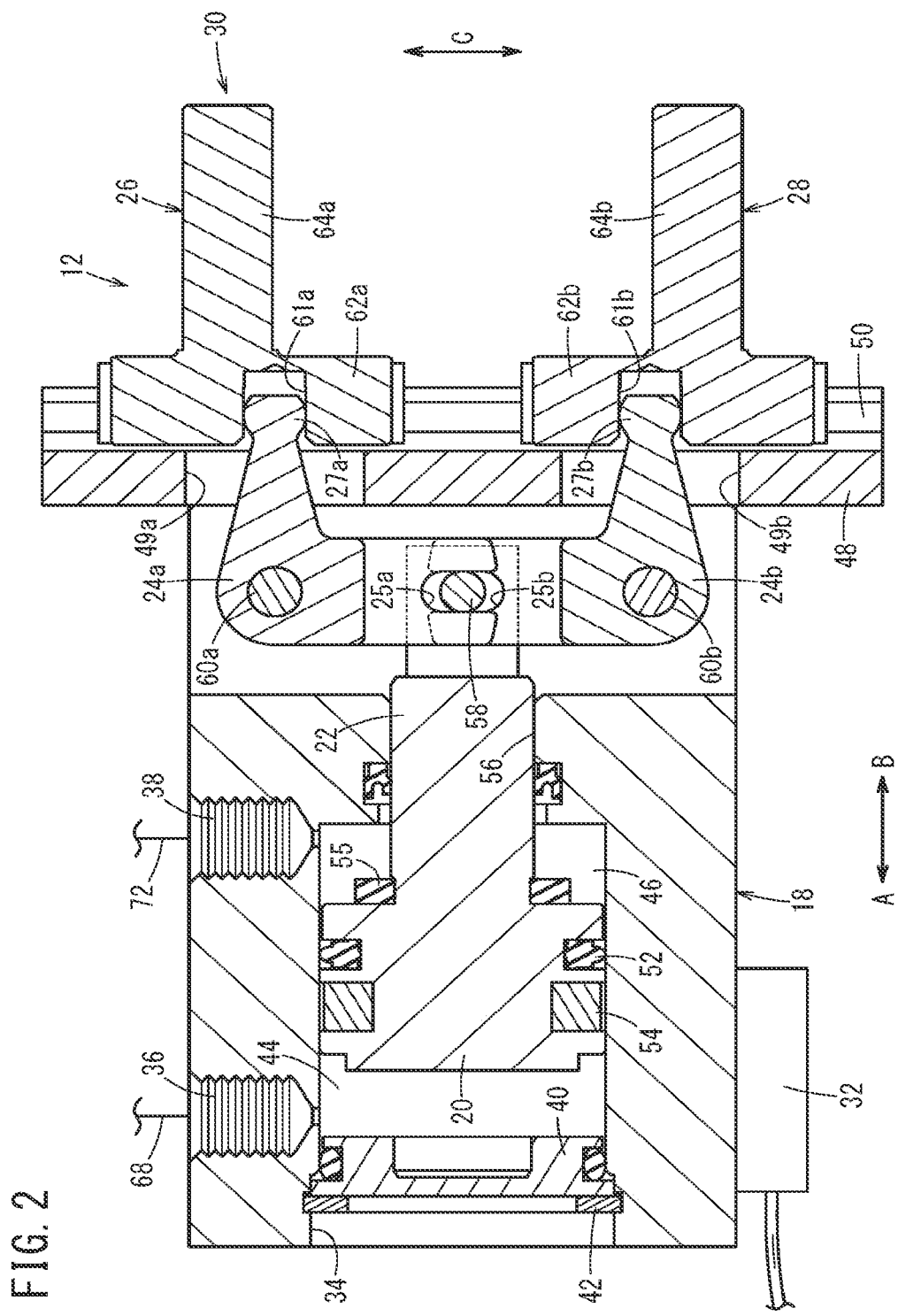
FIG. 2 is an overall cross-sectional view of the chuck device constituting the drive system in FIG. 1.

First, the configuration of the chuck device 12 will be described with reference to FIGS. 1 and 2.

The chuck device 12 includes a tubular chuck body 18, a piston 20 disposed inside the chuck body 18 to be freely displaced, a gripping portion 30 including a pair of first and second fingers 26 and 28 that open and close via levers 24a and 24b, respectively, engaged with a rod part 22 of the piston 20, and a detection sensor 32 disposed on a side part of the chuck body 18 to detect the position of the piston 20. The chuck device 12 described above is an air chuck opening and closing under the effect of supply of compressed air.

The chuck body 18 has, for example, a substantially rectangular cross-section. The chuck body 18 has a body hole 34 passing through the chuck body 18 in the axial direction (directions of arrows A and B) and the first and second body ports 36 and 38 opened in a side surface and communicating with the body hole 34 to supply and discharge pressurized fluid.

The body hole 34 is opened in one end part of the chuck body 18 and closed by a head cover 40 fitted in the body hole 34. The head cover 40 is held by a stop ring 42 while being engaged with a stepped part of the body hole 34, and the movement of the head cover 40 toward the open one end part (in the direction of the arrow A) is restricted by the stop ring 42.

The body hole 34 is partitioned into a head-side cylinder chamber (cylinder chamber) 44 (described below) formed between the piston 20 and the head cover 40 and a rod-side cylinder chamber (cylinder chamber) 46 defined between the piston 20 and another end part of the chuck body 18.

The first and second body ports 36 and 38 are separate from each other in the axial direction of the chuck body 18 (in the directions of the arrows A and B) by a predetermined distance. The first body port 36 communicates with the head-side cylinder chamber 44, and the second body port 38 communicates with the rod-side cylinder chamber 46. The first and second body ports 36 and 38 are connected to the first and second ports 66 and 70 (described below) of the switching valve 14 via first and second tubes 68 and 72, respectively, so that compressed air is supplied and discharged through the switching action of the switching valve 14.

On the other hand, a plate-like base body 48 is joined to the other end part of the chuck body 18 to be substantially orthogonal to the axis of the chuck body 18 and thus closes the other end part. The base body 48 has a pair of insertion holes 49a and 49b in which the levers 24a and 24b are partially fitted.

Moreover, a rail groove 50 is formed in the base body 48 so that the pair of first and second fingers 26 and 28 constituting the gripping portion 30 are guided to be freely displaced along the rail groove 50. The rail groove 50 is formed in a side surface of the base body 48 on a side opposite the side on which the chuck body 18 lies, and linearly extends in a longitudinal direction (in a direction of an arrow C in FIG. 2) substantially orthogonal to the axis of the chuck body 18.

The piston 20 can be displaced in the axial direction (in the directions of the arrows A and B) such that, for example, the outer circumferential surface can slide along the inner circumferential surface of the body hole 34. A piston packing 52 attached to the outer circumferential surface is in contact with the inner circumferential surface, and a magnet 54 is disposed adjacent to the piston packing 52.

The detection sensor 32 attached to the side surface of the chuck body 18 detects the magnetism of the magnet 54 and outputs the results in the form of an electrical signal to the controller 16. The axial position and the displacement speed of the piston 20 along the axial direction (along the directions of the arrows A and B) are calculated from the output.

Moreover, one end face of the piston 20 faces the head cover 40 inside the body hole 34, and another end face is provided with the rod part 22 having a reduced diameter and extending toward the base body 48 (in the direction of the arrow B). A damper 55 composed of an elastic material is attached to a border region between the rod part 22 and the other end face. The rod part 22 is fitted in a rod hole 56 having a smaller diameter than the body hole 34, and the leading end is provided with a link pin 58 orthogonal to the axial direction of the rod part 22. The pair of levers 24a and 24b are rotatably engaged with the leading end of the rod part 22 via the link pin 58.

The levers 24a and 24b having a substantially L-shaped cross-section are paired with each other and disposed to be symmetric with respect to the axis of the piston 20. The levers 24a and 24b are rotatably supported by support shafts 60a and 60b provided for the chuck body 18 and respectively fitted in bent, substantially middle parts of the levers 24a and 24b.

Moreover, first end parts of the levers 24a and 24b respectively engaged with the link pin 58 via semicircular notches 25a and 25b, and second end parts 27a and 27b having a deformed cross-section and expanding into a spherical shape are respectively fitted and held in engagement holes 61a and 61b in the first and second fingers 26 and 28 constituting the gripping portion 30.

That is, the first end parts of the pair of levers 24a and 24b move in the axial direction under the effect of displacement of the piston 20 (the rod part 22) along the axial direction (along the directions of the arrows A and B) via the link pin 58, and as a result of this, the second end parts 27a and 27b respectively rotate on the support shafts 60a and 60b to approach or be separated from each other.

The gripping portion 30 includes the pair of first and second fingers (fingers) 26 and 28 capable of being displaced along the rail groove 50 of the base body 48. The first and second fingers 26 and 28 respectively include block-like body parts 62a and 62b guided along the rail groove 50 and claw parts 64a and 64b respectively protruding from the body parts 62a and 62b to be substantially orthogonal to the body parts to grip a workpiece.

The first and second fingers 26 and 28 are disposed to be movable to approach and be separated from each other along the rail groove 50 of the base body 48. In this case, the first finger 26 and the second finger 28 move symmetrically with respect to the axis of the piston 20.

Next, the configuration of the switching valve 14 will be described with reference to FIGS. 1, 3, and 4.

The switching valve 14 is, for example, a 5-port servo valve including a valve element (not illustrated) that opens and closes in response to the valve command signal from the controller 16. The first port 66 is connected to the first body port 36 of the chuck device 12 via the first tube 68, and the second port 70 is connected to the second body port 38 via the second tube 72.

Moreover, in the switching valve 14, a supply port 74 is connected to an air supply source (supply source) 78 supplying compressed air via a third tube 76, and first and second exhaust ports 80 and 82 communicate with the outside.

When the switching valve 14 is in a first switch position P1 as illustrated in FIG. 1, the first and second ports 66 and 70 are not connected to any of the supply port 74 and the first and second exhaust ports 80 and 82. Thus, the switching valve 14 blocks supply of compressed air from the air supply source 78 to the chuck device 12 and discharge of compressed air from the chuck device 12, bringing the chuck device 12 to a standstill.

Figure 3:
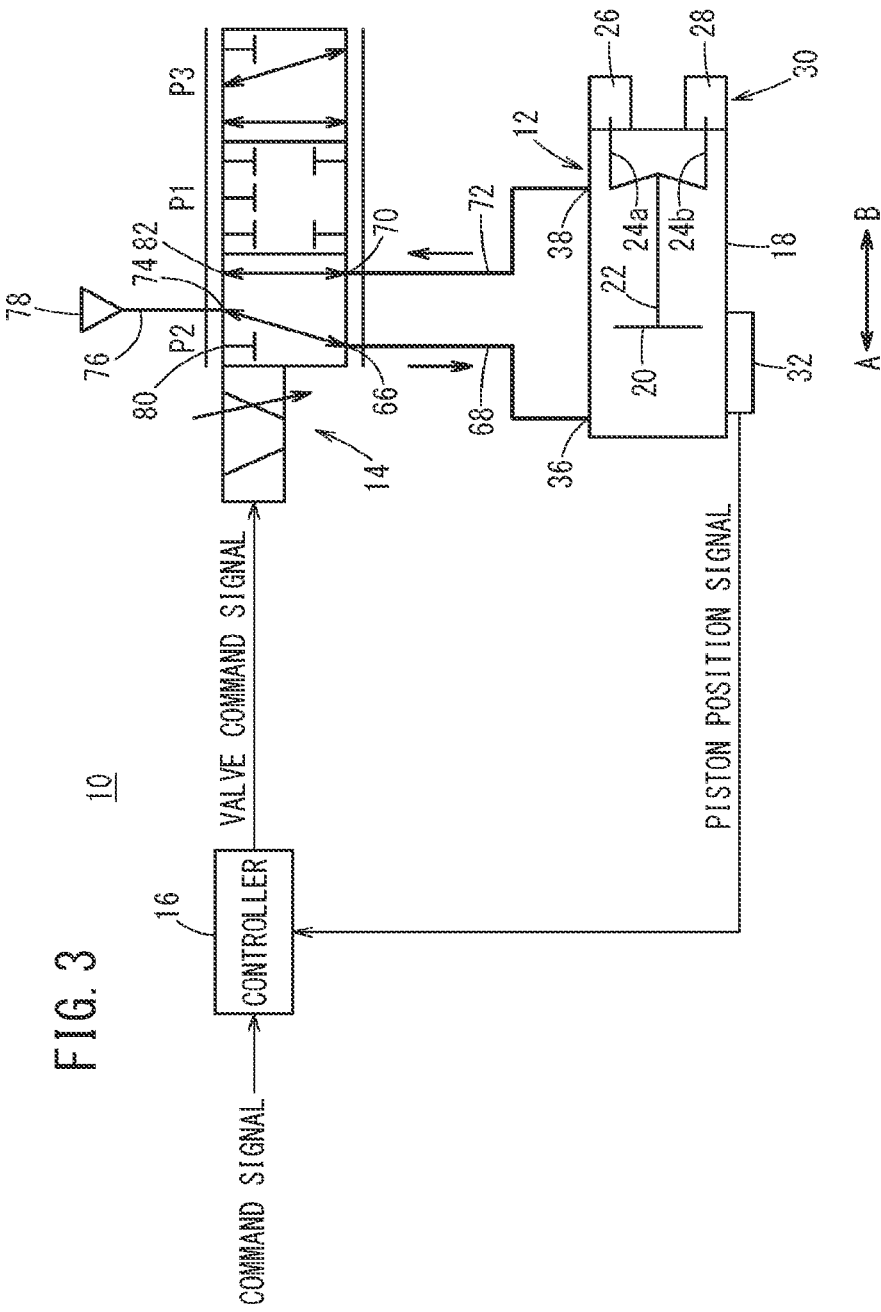
FIG. 3 is a schematic circuit diagram of the drive system in FIG. 1 when a switching valve is switched from a first switch position to a second switch position to change a gripping portion to a release state.

When the switching valve 14 is switched to a second switch position P2 as illustrated in FIG. 3 in response to the valve command signal, the supply port 74 communicates with the first port 66, and thus the air supply source 78 connected to the supply port 74 communicates with the first body port 36 of the chuck device 12. As a result, compressed air is supplied to the head-side cylinder chamber 44. At the same time, the second port 70 communicates with the second exhaust port 82, and thus the second body port 38 of the chuck device 12 communicates with the outside.

Figure 4:
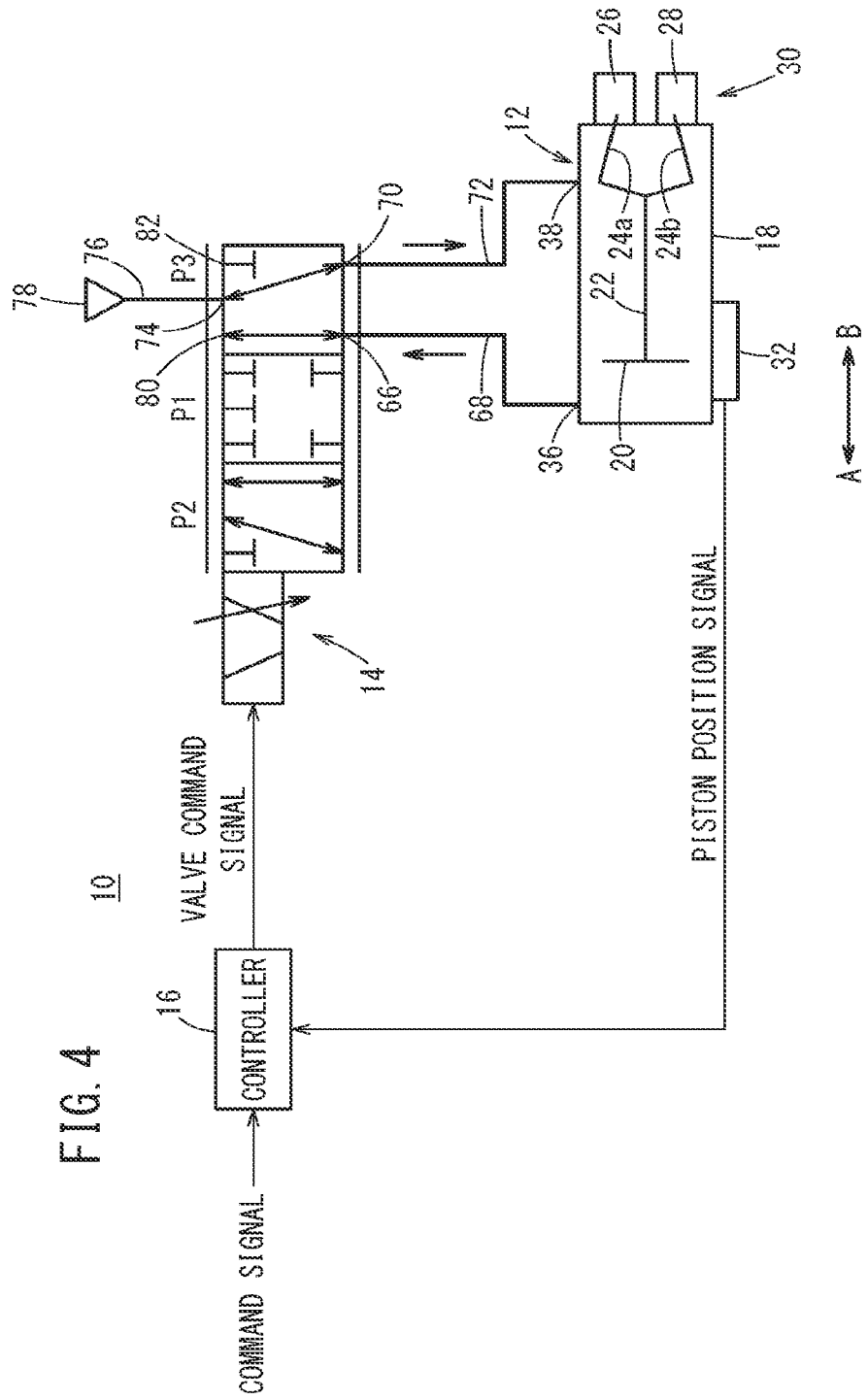
FIG. 4 is a schematic circuit diagram of the drive system in FIG. 1 when the switching valve is switched to a third switch position to change the gripping portion to a gripping state.

When the switching valve 14 is switched to a third switch position P3 as illustrated in FIG. 4 in response to the valve command signal, the first port 66 communicates with the first exhaust port 80, and thus the first body port 36 of the chuck device 12 communicates with the outside. At the same time, the supply port 74 communicates with the second port 70. As a result, the air supply source 78 communicates with the second body port 38 of the chuck device 12, and compressed air is supplied to the rod-side cylinder chamber 46.

Figure 5:
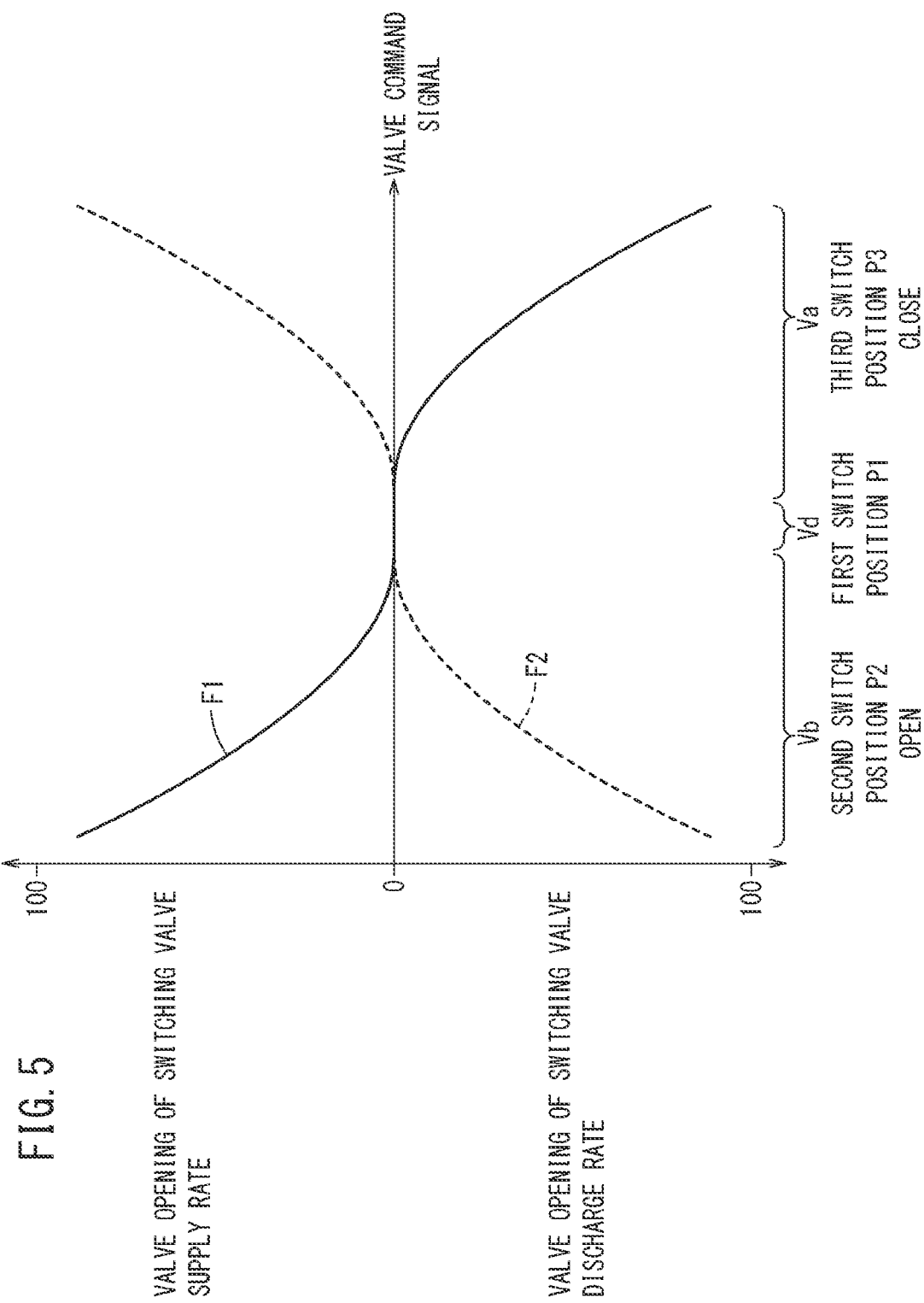
FIG. 5 is a diagram of characteristic curves illustrating the relationships between a valve command signal to the switching valve and the supply rate, the discharge rate, and the valve opening in the drive system in FIG. 1.

That is, the switching valve 14 described above can be freely and sequentially switched between the first switch position P1, the second switch position P2, and the third switch position P3 in response to the valve command signal input from the controller 16 based on, for example, a command voltage serving as the command signal. Specifically, the switching valve 14 is switched to the second switch position P2, the first switch position P1, and the third switch position P3 in this order as the value of the valve command signal gradually increases as illustrated in FIG. 5. The valve command signal is a signal for inputting, for example, timings of gripping or releasing and the amount of opening (amount of movement) of the first and second fingers 26 and 28 to the controller 16.

The drive system 10 for the chuck device 12 according to the embodiment of the present invention is basically configured as above. Next, the operations and operational effects thereof will be described. In the description below, a state where the switching valve 14 is in the first switch position P1 as illustrated in FIG. 1 is defined as an initial state.

To change the gripping portion 30 of the chuck device 12 from the initial state to a release state (open), the command signal indicating to change the gripping portion 30 to the open state is input to the controller 16, and the valve command signal is input from the controller 16 to the switching valve 14 to move the valve element (not illustrated). This causes the switching valve 14 to be switched to the second switch position P2 in which the supply port 74 is connected to the first port 66 while the second port 70 is connected to the second exhaust port 82 as illustrated in FIG. 3.

As a result, compressed air from the air supply source 78 is supplied to the first body port 36 of the chuck device 12 through the first tube 68 after flowing through the third tube 76, and the supply port 74 and the first port 66 of the switching valve 14.

Then, the piston 20 of the chuck device 12 is pushed by the compressed air supplied from the first body port 36 to the head-side cylinder chamber 44 and moves toward the other end part (in the direction of the arrow B) along the chuck body 18. As the piston 20 moves, the compressed air in the rod-side cylinder chamber 46 is discharged from the second body port 38 through the second tube 72 and from the second port 70 of the switching valve 14 to the outside through the second exhaust port 82.

The movement of the piston 20 toward the other end part (in the direction of the arrow B) causes the pair of levers 24a and 24b engaged with the rod part 22 to rotate respectively on the support shafts 60a and 60b such that the second end parts 27a and 27b are separated from each other. As a result, the first and second fingers 26 and 28 move outward along the rail groove 50 to be separated from each other, and enter the release state.

Moreover, the magnetism of the magnet 54 attached to the piston 20 is detected by the detection sensor 32 disposed on the chuck body 18 and is output to the controller 16 as a position signal. This enables the axial position of the piston 20 along the axial direction to be determined. Thus, based on the position of the piston 20, it is determined that the first and second fingers 26 and 28 are in an open position (release state; open) where the first and second fingers 26 and 28 are separated from each other.

In this case, the piston 20 is displaced until coming into contact with an end part of the body hole 34, and then stops. The amount of outward movement (the amount of opening) of the first and second fingers 26 and 28 corresponds to the axial position of the piston 20.

Next, how the gripping portion 30 including the first and second fingers 26 and 28 in the above-described release state is switched to a gripping state where the gripping portion 30 grips a workpiece or the like will be described.

First, the command signal indicating to change the gripping portion 30 to a closed state is input to the controller 16, and the valve command signal is input from the controller 16 to the switching valve 14 to move the valve element (not illustrated). This causes the switching valve 14 to be switched to the third switch position P3 in which the supply port 74 is connected to the second port 70 while the first port 66 is connected to the first exhaust port 80 as illustrated in FIG. 4.

As a result, supply of compressed air from the air supply source 78 to the first body port 36 stops while the compressed air is supplied to the second body port 38 of the chuck device 12 through the second tube 72 after flowing through the supply port 74 and the second port 70 of the switching valve 14.

Then, the piston 20 of the chuck device 12 is pushed by the compressed air supplied from the second body port 38 to the rod-side cylinder chamber 46 and moves toward the one end part (in the direction of the arrow A) along the chuck body 18. As the piston 20 moves, the compressed air in the head-side cylinder chamber 44 is discharged from the first body port 36 through the first tube 68 and from the first port 66 of the switching valve 14 to the outside through the first exhaust port 80.

The movement of the piston 20 toward the one end part (in the direction of the arrow A) causes the pair of levers 24a and 24b to rotate respectively on the support shafts 60a and 60b such that the second end parts 27a and 27b approach each other. As a result, the first and second fingers 26 and 28 move inward along the rail groove 50 to approach each other. Thus, the gripping portion 30 enters the gripping state where the gripping portion 30 can grip a workpiece (not illustrated) disposed between the claw part 64a of the first finger 26 and the claw part 64b of the second finger 28.

Moreover, the magnetism of the magnet 54 attached to the piston 20 is detected by the detection sensor 32 and is output to the controller 16 as the position signal. As a result of this, the axial position of the piston 20 is determined, and at the same time, it is determined that the first and second fingers 26 and 28 are in a closed position (gripping state; closed) where the first and second fingers 26 and 28 are close to each other.

In this case, the piston 20 moves toward the head cover 40 until the first and second fingers 26 and 28 grip the workpiece or until the first and second fingers 26 and 28 come into contact with each other.

Figure 6:
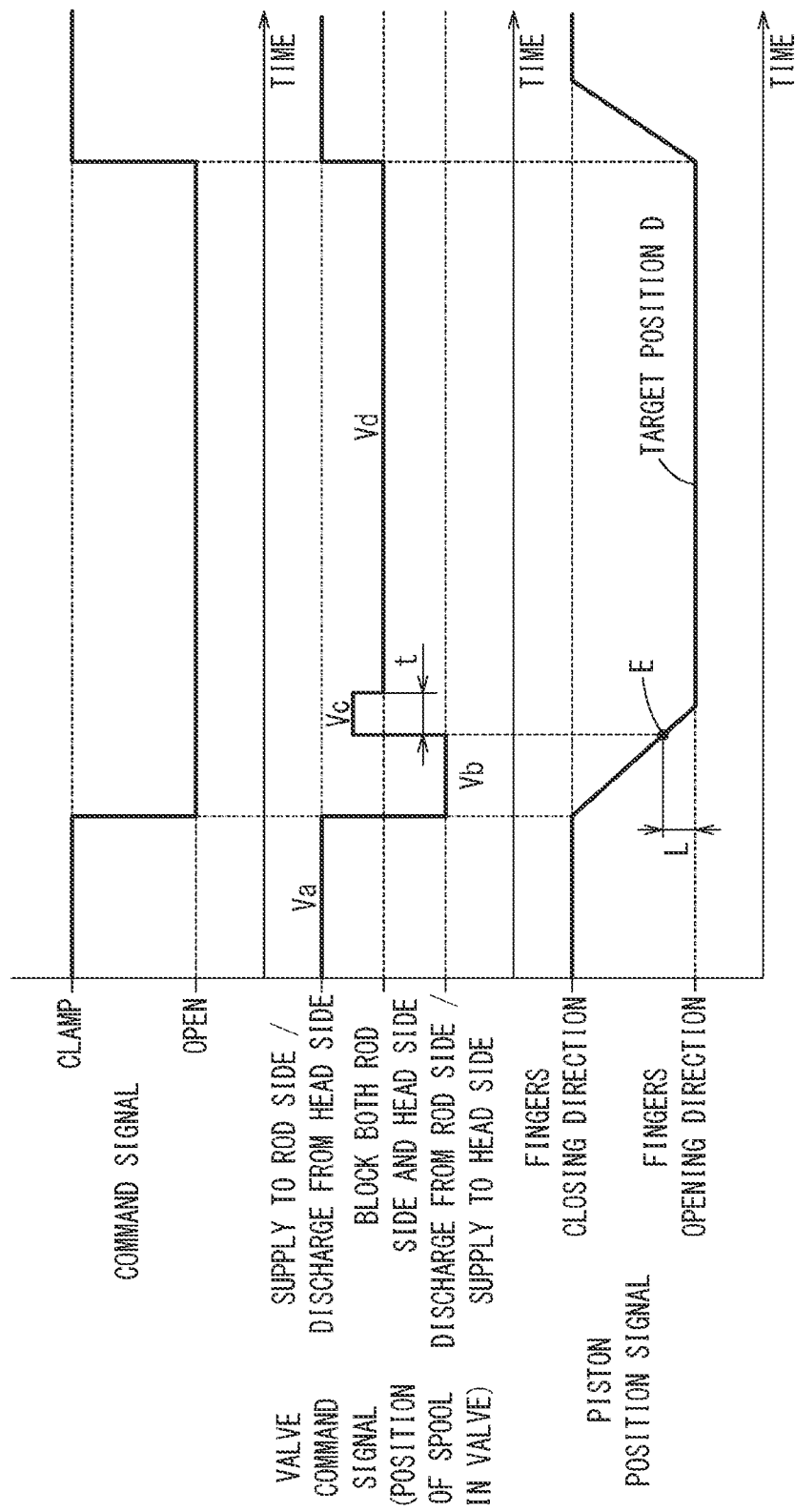
FIG. 6 is a time chart illustrating the relationships between time and a command signal to a controller, the valve command signal from the controller to the switching valve, and a piston position signal in the drive system in FIG. 1.

Next, how the gripping portion 30 including the first and second fingers 26 and 28 is stopped at a freely selected intermediate position between a release position and a gripping position will be described with reference to FIGS. 5 and 6. In the description below, the first and second fingers 26 and 28 are moved from the closed position (gripping state) and stopped in the intermediate position.

FIG. 5 described above is a diagram of characteristic curves illustrating the relationships between the valve command signal from the controller 16 to the switching valve 14 and the state of supply and discharge of compressed air at the first and second ports 66 and 70. In FIG. 5, a characteristic curve F1 drawn with a solid line illustrates the state of supply and discharge of compressed air to and from the first port 66 (the first body port 36), and a characteristic curve F2 drawn with a broken line illustrates the state of supply and discharge of the compressed air to and from the second port 70 (the second body port 38). That is, the state of supply and discharge of compressed air to and from the first port 66 and the flow rate (opening) change according to the value of the valve command signal. The same applies to the second port 70.

First, the command signal indicating to change the gripping portion 30 to the closed state is input to the controller 16, and the valve command signal indicating to open the switching valve 14 at a first opening Va is input to the switching valve 14 based on the command signal. This causes the switching valve 14 to be switched to the third switch position P3 and thus causes the first and second fingers 26 and 28 to be placed in the closed position. The axial position of the piston 20 is detected by the detection sensor 32 and is input to the controller 16 as the position signal. As a result, it is determined that the first and second fingers 26 and 28 are in the closed position.

As can be understood from FIG. 5, in the third switch position P3, the opening of the first port 66 and the opening of the second port 70 at a predetermined value of the valve command signal are identical to each other, and the flow rate of compressed air discharged from the chuck device 12 through the first port 66 (the characteristic curve F1) and the flow rate of compressed air supplied to the chuck device 12 through the second port 70 (the characteristic curve F2) are substantially identical to each other.

Next, the command signal indicating to change the gripping portion 30 from the closed state to the release state is input to the controller 16, and the valve command signal based on the command signal is input from the controller 16 to the switching valve 14. This causes the switching valve 14 to be switched to the second switch position P2 (see FIG. 3) in which the switching valve 14 is opened at a second opening (first degree of valve opening) Vb. As a result, as illustrated in FIG. 3, compressed air from the air supply source 78 is supplied to the first body port 36 through the supply port 74 and the first port 66 while the compressed air inside the rod-side cylinder chamber 46 is discharged from the second port 70 through the second exhaust port 82.

Also in the second switch position P2, the opening of the first port 66 and the opening of the second port 70 at a predetermined value of the valve command signal are identical to each other, and the flow rate of compressed air supplied to the chuck device 12 through the first port 66 (the characteristic curve F1) and the flow rate of compressed air discharged from the chuck device 12 through the second port 70 (the characteristic curve F2) are substantially identical to each other.

This causes the piston 20 of the chuck device 12 to start moving in a direction away from the head cover 40 (in the direction of the arrow B), and as a result, causes the first and second fingers 26 and 28 to start moving along the rail groove 50 to be separated from each other.

The change in the axial position of the piston 20 is detected by the detection sensor 32. When the detection sensor 32 detects that the piston 20 reaches a switch point E, which is a predetermined distance L short of a target position D of the piston 20 corresponding to the intermediate position of the first and second fingers 26 and 28, the valve command signal indicating to open the switching valve 14 at a third opening (third degree of valve opening) Vc is output from the controller 16 to the switching valve 14.

The third opening Vc is a degree of opening at which the switching valve 14 is switched from the second switch position P2 to the third switch position P3, and compressed air is supplied from the second body port 38 to the rod-side cylinder chamber 46 while the compressed air in the head-side cylinder chamber 44 is discharged through the first body port 36. As illustrated in FIG. 6, the third opening Vc is set closer to the first opening Va than a degree of opening at which both the rod side and the head side are blocked.

After the switching valve 14 is opened at the third opening Vc for a predetermined period t, the switching valve 14 is switched to be opened at a fourth opening (second degree of valve opening) Vd in response to the updated valve command signal from the controller 16. This causes the switching valve 14 to be switched to the first switch position P1 (see FIG. 1) in which the supply and discharge of compressed air to and from the first and second body ports 36 and 38 are stopped.

Moreover, the axial position of the piston 20 is input to the controller 16 as the position signal, whereby it is determined that the first and second fingers 26 and 28 are open and at a standstill in the freely selected intermediate position.

That is, the switching valve 14 is switched to stop supplying compressed air to the first body port 36 and to supply compressed air to the second body port 38 for the predetermined period t before the first and second fingers 26 and 28 reach the predetermined intermediate position (the target position D of the piston 20). As a result, the displacement speed of the piston 20 can be favorably reduced, and the piston 20 can be stopped at the predetermined axial position (the target position D) with high precision. Thus, the first and second fingers 26 and 28 can be stopped in the desired intermediate position with high precision.

Moreover, the displacement speed of the first and second fingers 26 and 28 is set by the first opening Va and the second opening Vb of the switching valve 14, and the precision in stopping the first and second fingers 26 and 28 in the intermediate position is determined by the third opening Vc, the predetermined distance L to the target position D of the piston 20 along the axial direction, and the predetermined period t in which the switching valve 14 is opened at the third opening Vc.

The optimum values of the first opening Va, the second opening Vb, the third opening Vc, the predetermined distance L to the target position D of the piston 20, and the predetermined period t vary depending on various conditions of the chuck device 12 such as the inner diameter of the body hole 34 in the chuck body 18 and the amount of stroke of the piston 20 along the axial direction, and are stored in the control map of the controller 16 in advance according to the specifications and the driving conditions of the chuck device 12.

Moreover, the position of the piston 20 detected by the detection sensor 32 is output to the controller 16, and the valve command signal output to the switching valve 14 is changed based on the axial position and the displacement speed of the piston 20 calculated by the controller 16 to change the valve opening of the switching valve 14 as appropriate. As a result, opening and closing of the first and second fingers 26 and 28 can be controlled more precisely.

Figure 7:
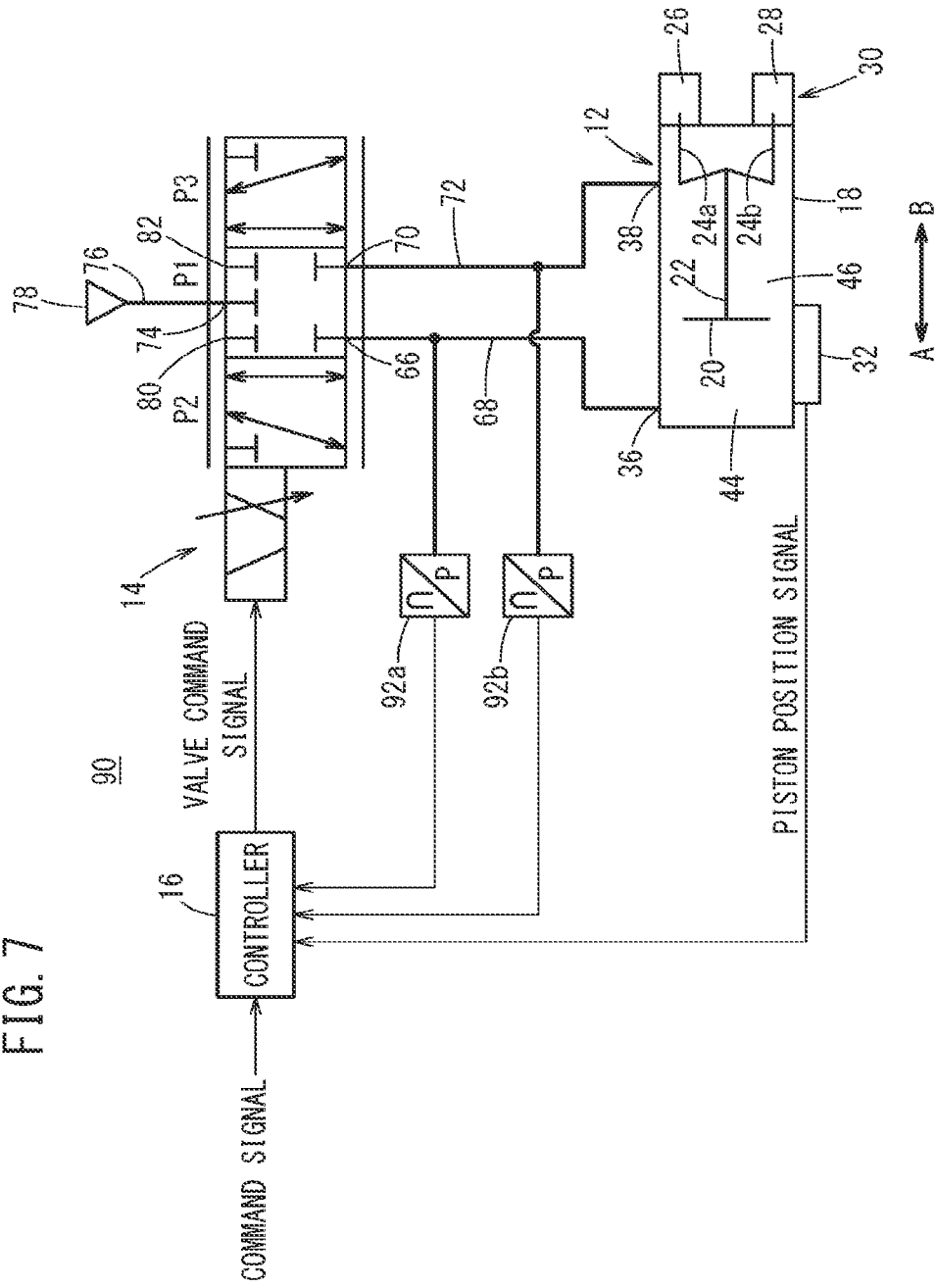
FIG. 7 is a schematic circuit diagram of a drive system obtained by providing a pair of pressure sensors capable of detecting the pressures in a head-side cylinder chamber and a rod-side cylinder chamber for the drive system in FIG. 1.

Furthermore, as in a drive system 90 illustrated in FIG. 7, the drive system may be provided with pressure sensors 92*a* and 92*b* respectively capable of detecting the pressures inside the head-side cylinder chamber 44 (the first body port 36) and the rod-side cylinder chamber 46 (the second body port 38) in the chuck device 12. At least one of the pressures in the head-side cylinder chamber 44 and the rod-side cylinder chamber 46 respectively detected by the pressure sensors 92*a* and 92*b* may be output to the controller 16, and the valve command signal based on the pressures may be output to the switching valve 14 to set the valve opening and the switching timing of the switching valve 14.

Figure 8:
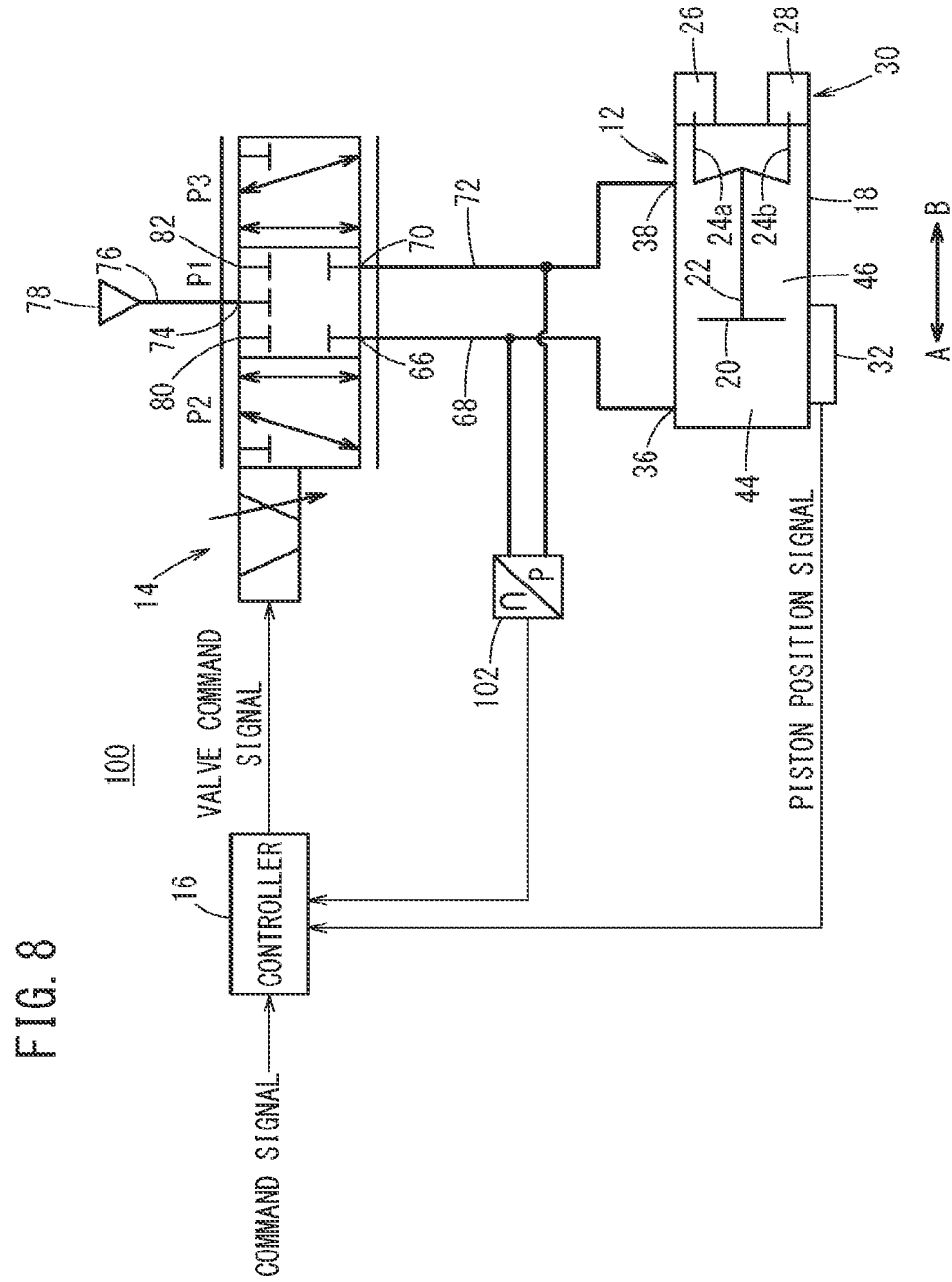
FIG. 8 is a schematic circuit diagram of a drive system obtained by providing a differential pressure sensor capable of detecting the difference between the pressure in the head-side cylinder chamber and the pressure in the rod-side cylinder chamber for the drive system in FIG. 1.

Yet moreover, as in a drive system 100 illustrated in FIG. 8, the drive system may be provided with a differential pressure sensor 102 capable of detecting the difference between the pressure in the head-side cylinder chamber 44 (the first body port 36) and the pressure in the rod-side cylinder chamber 46 (the second body port 38). The pressure difference detected by the differential pressure sensor 102 may be output to the controller 16, and the valve command signal based on the pressure difference may be output to the switching valve 14 to set the valve opening and the switching timing of the switching valve 14.

In this manner, the drive system 90 provided with the pressure sensors 92*a* and 92*b* and the drive system 100 provided with the differential pressure sensor 102 can precisely control the opening and closing of the first and second fingers 26 and 28 and, at the same time, can favorably adjust the gripping force of the first and second fingers 26 and 28 during gripping of the workpiece based on the pressures detected by the pressure sensors 92*a* and 92*b* and the pressure difference detected by the differential pressure sensor 102, respectively.

Moreover, in a case where the volumes of the head-side cylinder chamber 44 and the rod-side cylinder chamber 46 of the chuck device 12 are relatively small, supply and discharge of compressed air need to be switched quickly in a short time. Thus, for example, a 5-port air servo valve, which directly drives a spool (valve element) in the axial direction using a linear motor, is the most suitable for the switching valve 14.

Figure 9:
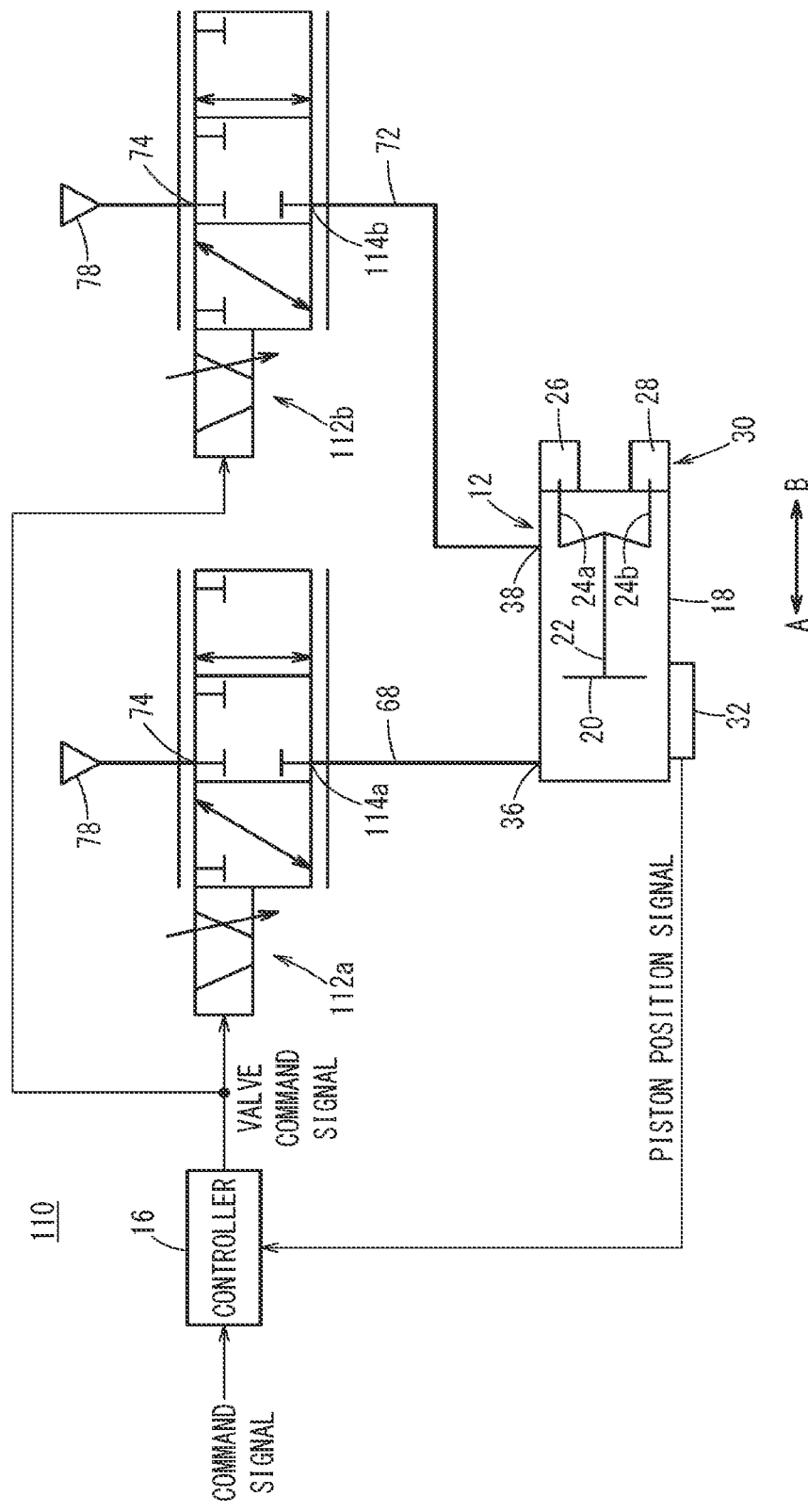
FIG. 9 is a schematic circuit diagram illustrating a drive system for the chuck device according to a modification, the drive system including a pair of switching valves.

On the other hand, the switching valve 14 switching the state of supply of compressed air to the chuck device 12 is not limited to the 5-port servo valve as in the above-described drive systems 10, 90, and 100. For example, as in a drive system 110 illustrated in FIG. 9, the drive system may be provided with a pair of switching valves 112*a* and 112*b*, which are 3-port servo valves, and an output port 114*a* of the switching valve 112*a* may be connected to the first body port 36 of the chuck device 12 while an output port 114*b* of the switching valve 112*b* may be connected to the second body port 38 of the chuck device 12.

To change the chuck device 12 to the open state in the drive system 110, compressed air is supplied from the switching valve 112*a* to the first body port 36 while compressed air is discharged from the chuck device 12 to the outside through the switching valve 112*b*. This causes the first and second fingers 26 and 28 to enter the release state (open) under the effect of displacement of the piston 20.

On the other hand, to change the chuck device 12 to the closed state, compressed air is supplied from the switching valve 112*b* to the second body port 38 while compressed air is discharged from the chuck device 12 to the outside through the switching valve 112*a*. This causes the first and second fingers 26 and 28 to enter the gripping state (closed) under the effect of displacement of the piston 20.

Moreover, the first and second fingers 26 and 28 can also be stopped at a freely selected intermediate position by switching the state of supply of compressed air to the chuck device 12 as appropriate using the switching valves 112a and 112b.

The drive systems 10, 90, 100, and 110 and the control methods for the chuck device 12 according to the present invention are not limited in particular to the embodiments described above, and may have various configurations without departing from the scope of the present invention as a matter of course.

What is claimed is:

1. A drive system for driving a chuck device including a piston displaceable in an axial direction under an effect of supply of fluid and a pair of fingers configured to be opened and closed according to the displacement of the piston, the drive system comprising:
    a controller;
    a detection sensor configured to detect an axial position of the piston; and
    a switching valve configured to switch a state of supply of the fluid to the chuck device,
    wherein the switching valve is a servo valve, of which degree of valve opening is controllable based on a control signal input from the controller, and an amount of displacement of the piston and an amount of opening and closing of the fingers are controlled by changing the degree of valve opening, and
    wherein:
    the switching valve includes a pair of 3-port servo valves;
    one of the 3-port servo valves is connected to a first cylinder chamber of the chuck device, and another of the 3-port servo valves is connected to a second cylinder chamber of the chuck device, and
    the controller controls the switching valve to stop the fingers at an intermediate position located between a fully open position and a fully closed position, by:
    opening or closing the fingers by opening the switching valve at a first degree of valve opening to supply the fluid to the first cylinder chamber and to discharge the fluid from the second cylinder chamber so that the piston moves in one axial direction,
    reducing, while the fingers are being opened or closed, a displacement speed of the piston moving in the one axial direction by switching the valve opening to a second degree of valve opening to supply the fluid to the second cylinder chamber and to discharge the fluid from the first cylinder chamber when the detection sensor detects that the piston reaches a switching point, which switching point is ahead of a predetermined target position of the piston in said one axial direction by a predetermined distance, the predetermined target position corresponding to the intermediate position of the fingers, such that the piston reaches the switching point before reaching the predetermined target position when moving in said one axial direction; and
    stopping the fingers at said intermediate position by opening the switching valve at a third degree of valve opening to stop supplying the fluid to the second cylinder chamber and to stop discharging the fluid from the first cylinder chamber when the piston reaches the predetermined target position.

2. A drive system for driving a chuck device including a piston displaceable in an axial direction under an effect of supply of fluid and a pair of fingers configured to be opened and closed according to the displacement of the piston, the drive system comprising:
    a controller;
    a detection sensor configured to detect an axial position of the piston; and
    a switching valve configured to switch a state of supply of the fluid to the chuck device,
    wherein the switching valve is a servo valve, of which degree of valve opening is controllable based on a control signal input from the controller, and an amount of displacement of the piston and an amount of opening and closing of the fingers are controlled by changing the degree of valve opening, and
    the controller controls the switching valve to stop the fingers at an intermediate position located between a fully open position and a fully closed position, by:
    opening or closing the fingers by opening the switching valve at a first degree of valve opening to supply the fluid to the first cylinder chamber and to discharge the fluid from the second cylinder chamber so that the piston moves in one axial direction,
    reducing, while the fingers are being opened or closed, a displacement speed of the piston moving in the one axial direction by switching the valve opening to a second degree of valve opening to supply the fluid to the second cylinder chamber and to discharge the fluid from the first cylinder chamber when the detection sensor detects that the piston reaches a switching point, which switching point is ahead of a predetermined target position of the piston in said one axial direction by a predetermined distance, the predetermined target position corresponding to the intermediate position of the fingers, such that the piston reaches the switching point before reaching the predetermined target position when moving in said one axial direction; and
    stopping the fingers at said intermediate position by opening the switching valve at a third degree of valve opening to stop supplying the fluid to the second cylinder chamber and to stop discharging the fluid from the first cylinder chamber when the piston reaches the predetermined target position.

* * * * *